US011994882B2

(12) United States Patent
Conrad

(10) Patent No.: US 11,994,882 B2
(45) Date of Patent: May 28, 2024

(54) LIQUID EJECTION DEVICE FOR A VEHICLE WASHING FACILITY, AND METHOD FOR OPERATING SAME

(71) Applicant: WASHTEC HOLDING GMBH, Augsburg (DE)

(72) Inventor: Ferdinand Conrad, Augsburg (DE)

(73) Assignee: WashTec Holding GmbH, Augsburg (DE)

( * ) Notice: Subject to any disclaimer, the term of this patent is extended or adjusted under 35 U.S.C. 154(b) by 440 days.

(21) Appl. No.: 17/282,365

(22) PCT Filed: Oct. 4, 2019

(86) PCT No.: PCT/EP2019/076879
§ 371 (c)(1),
(2) Date: Apr. 1, 2021

(87) PCT Pub. No.: WO2020/070270
PCT Pub. Date: Apr. 9, 2020

(65) Prior Publication Data
US 2021/0341953 A1    Nov. 4, 2021

(30) Foreign Application Priority Data

Oct. 5, 2018    (DE) .................... 10 2018 124 656.0

(51) Int. Cl.
*B01F 23/20*    (2022.01)
*B01F 25/31*    (2022.01)
(Continued)

(52) U.S. Cl.
CPC ............ *G05D 11/133* (2013.01); *B01F 23/29* (2022.01); *B01F 25/311* (2022.01);
(Continued)

(58) Field of Classification Search
None
See application file for complete search history.

(56) References Cited

U.S. PATENT DOCUMENTS

2013/0104668 A1    5/2013    Hanko

FOREIGN PATENT DOCUMENTS

CN        201736963 U    2/2011
CN        206075430 U    4/2017
(Continued)

OTHER PUBLICATIONS

International Search Report, Written Opinion and International Preliminary Report on Patentability, for PCT/EP2019/076879 filed Oct. 4, 2019.

(Continued)

*Primary Examiner* — Levon J Shahinian
(74) *Attorney, Agent, or Firm* — Paul D. Bianco; Katharine Davis Wong; Fleit Intellectual Property Law

(57) ABSTRACT

A liquid ejection device for a vehicle washing facility comprises a storage volume, a first supply line coupled upstream to the storage volume for supplying a first liquid, a supply unit coupled upstream to the storage volume for supplying a second liquid, and a removal line coupled downstream to the storage volume for discharging the liquid to be ejected, with a shut-off device for shutting off liquid flow through the removal line. The storage volume is sealed so that an increase in an internal gas pressure occurs in the storage volume when liquid is introduced. The device further comprises a detection unit for detecting the supplied volume of the second liquid into the storage volume and the internal gas pressure in the storage volume, and a control unit controls the supply of the second liquid based on the detected supplied volume of the second liquid and the (Continued)

internal gas pressure so that a predetermined mixing ratio of the first and second liquid is achieved in the storage volume.

21 Claims, 3 Drawing Sheets

(51) Int. Cl.
    *B01F 35/21*           (2022.01)
    *B01F 35/22*           (2022.01)
    *B01F 35/221*         (2022.01)
    *B60S 3/04*            (2006.01)
    *G05D 11/13*          (2006.01)
    *B01F 101/24*         (2022.01)

(52) U.S. Cl.
    CPC ...... *B01F 35/2111* (2022.01); *B01F 35/2132* (2022.01); *B01F 35/2202* (2022.01); *B01F 35/2211* (2022.01); *B60S 3/04* (2013.01); *B01F 2101/24* (2022.01)

(56) References Cited

FOREIGN PATENT DOCUMENTS

DE     10 2011 003615 A1     8/2012
WO         02/05047 A1     1/2002

OTHER PUBLICATIONS

International Preliminary Report on Patentability dated Dec. 2, 2020 for PCT/EP2019/076879.
Chinese Office Action dated Jun. 27, 2023 for Chinese Application No. 201980064796.8.

US 11,994,882 B2

LIQUID EJECTION DEVICE FOR A VEHICLE WASHING FACILITY, AND METHOD FOR OPERATING SAME

FIELD OF THE INVENTION

The present invention relates to a liquid ejection device for a vehicle washing facility having a storage volume, a first supply line coupled upstream to the storage volume for supplying a first liquid, and a supply unit coupled upstream to the storage volume for supplying a second liquid. It further comprises a removal line coupled downstream to the storage volume for discharging the liquid to be ejected, with a shut-off device for shutting off a flow of liquid through the removal line. The invention additionally relates to a method for operating a liquid ejection device for a vehicle washing facility, in which a first and a second liquid are introduced into a storage volume.

BACKGROUND OF THE INVENTION

In various technical areas of application, liquids must be mixed together in as precise a ratio as possible. For example, cleaning agents are provided in highly concentrated form and diluted with water for use. In this case, it is particularly desirable to be able to adjust the concentration appropriately for the particular application and to be able to adapt it to the current needs. Mixtures of liquids, especially chemicals and water, can be referred to as a "liquor" or "chemical liquor".

It is known, for example, to introduce a first liquid into a stream of a second liquid, for example in order to dilute cleaning agents in water in a vehicle washing facility. In this case, it has proved to be disadvantageous that it is only possible to switch between different concentrations with a considerable delay, for example if different concentrations are to be supplied for washing wheel rims with different degrees of soiling. This is due, for example, to the fact that the last mixture used is in the lines and other components of the system and must first be flushed out of the line before another mixture can be provided.

In addition, the power of pumps for feeding concentrated cleaning agent into a water stream is often limited. However, to achieve high concentrations in the resulting mixture, the agent must be fed at a high flow rate. Several pumps or particularly large pumps must therefore be provided, which has an unfavourable effect on the cost of such a system. For example, pneumatic piston pumps can be used, in which a volume per piston stroke can be mechanically adjusted. These solutions, however, have proven to be too inflexible when variable volumes are to be dosed.

SUMMARY OF THE INVENTION

One aspect of the present invention relates to a device and a method of the kind mentioned at the outset, by means of which mixing ratios can be varied rapidly over a particularly wide range and a particularly simple structure is made possible.

Advantageous embodiments and developments are disclosed herein.

The liquid ejection device of the above-mentioned type according to the invention is characterised in that the storage volume is sealed gas-tightly, so that an increase in an internal gas pressure in the storage volume occurs when liquid is introduced, in that the liquid ejection device comprises a detection unit for detecting the supplied volume of the second liquid into the storage volume and the internal gas pressure in the storage volume, and in that a control unit coupled to the detection unit and the supply unit controls the supply of the second liquid on the basis of the detected supplied volume of the second liquid and the internal gas pressure such that a predetermined mixing ratio of the first and second liquids is achieved in the storage volume.

Advantageously, this allows the amount of liquid introduced into the storage volume to be monitored without having to provide additional measures for this purpose. In particular, special additional means for measuring the volume of the first liquid introduced or for dosing it can be omitted. The first liquid, for example water, can be supplied from a line without precisely measuring or monitoring the pressure and the exact flow rate. Instead, the volume of the liquid introduced is determined by the pressure built up when the first and/or second liquid is introduced into the gas-tightly sealed storage volume. This is due in particular to the fact that the storage volume contains a gas, which, in contrast to the introduced liquid, is compressible. For example, the gas, in particular air, can enter the storage volume when the liquid is removed from it and/or when the system is ventilated. Typically, the compressed gas occupies ½ to ⅛ of the total volume.

The storage volume is sealed gas-tightly so that an increase in internal gas pressure occurs in the storage volume when liquid is introduced. For this purpose, the storage volume can be closed gas-tightly, for example by means of a closure or a valve. The detected internal gas pressure in the storage volume corresponds in particular to a pressure that must be overcome to introduce the second liquid. The value of the introduced volume of the first and second liquid is determined on the basis of the detected internal gas pressure of the storage volume, taking advantage of the fact that the internal gas pressure in the gas-tight storage volume increases with the increasing volume of the introduced liquid.

In one embodiment of the invention, the control unit is designed to determine a current mixing ratio of the liquid in the storage volume on the basis of the detected internal gas pressure and the introduced volume of the second liquid. Alternatively or additionally, the volume of liquid in the storage volume and/or a volume of the second liquid still to be introduced is determined. Advantageously, this allows the mixing ratio to be monitored precisely and adjusted quickly if necessary.

It can be provided, for example, that the internal gas pressure of the storage volume is detected periodically within certain time intervals and the volume of the liquid amount in the storage volume is determined on the basis of this pressure. The current mixing ratio can be determined in particular on the basis of the detected total liquid volume and a supplied volume of the second liquid measured on the basis of the flow rate. With this method, the current mixing ratio can be determined without having to measure the volume for both liquids individually.

The supply unit for the second liquid can be designed in a manner known per se. A plurality of supply units can be provided, in particular for a plurality of liquids. In particular, it can also be provided that the first and second liquids are supplied one after the other, i.e. sequentially, it being possible in particular to use a common supply unit. Furthermore, in one embodiment, the first and second liquids can be supplied simultaneously by means of a common supply unit.

In a further embodiment, the supply unit comprises an electric metering pump, in particular with an electromagnetically driven piston. The supply is thus advantageously particularly precise and can be quickly controlled, for example in order to be able to quickly and flexibly adjust the flow and volume of the supplied liquid.

The electric metering pump can supply the second liquid; in further embodiments, the first liquid can also be supplied by it or another electric metering pump can be provided to supply the first liquid.

In particular, the electric metering pump is designed in such a way that the supplied volume can be controlled during operation, i.e. the total supplied volume and the rate of supply can be adjusted during the supply. This distinguishes the electric metering pump from alternatives, such as simple pneumatic piston pumps, which fully eject a fixedly predetermined volume or at least a volume to be set in advance. In other exemplary embodiments, other types of pumps can also be used.

The pressure can be detected in a manner known per se, with various known pressure sensors being suitable to directly measure the internal gas pressure in the storage volume. The pressure can also be measured when the first liquid is introduced into the storage volume.

In another embodiment, the supply unit comprises a pressure detection element for detecting the internal gas pressure. In particular, the pressure detection element is coupled to the detection unit. This makes it possible advantageously to determine the internal gas pressure in the storage volume when introducing the second liquid with the aid of the supply unit. In particular, the counterpressure of the storage volume that must be overcome in order to supply the second liquid is determined. In particular, the force against which the electric metering pump is working is measured. Based on such a measurement, the pressure in the storage volume can be determined. The pressure detection element may further be comprised by the detection unit, or the detection unit may be coupled thereto and may detect the internal gas pressure by means of the pressure detection element.

In a further embodiment, the pressure detection element is designed to detect a power consumption of the supply unit and to determine the internal gas pressure on the basis of the power consumption. In particular, the greater the internal gas pressure, the greater the power required to supply the second liquid at a specific supply rate. The supply unit comprises in particular an electric metering pump. Advantageously, this allows the internal gas pressure to be determined indirectly as a counterpressure when supplying the second and/or first liquid, without having to arrange a separate device, such as a sensor, for example in the storage volume. For example, a component which detects the power consumption or a certain part of the total power consumption of the supply unit and is coupled to the detection unit in such a way that the latter can determine the internal gas pressure on the basis of the detected data can be used as a pressure detection element. Such a component can be integrated into the supply unit, for example.

The power consumption of the pump is proportional to the product of the volume flow and the pressure difference against which the pump is working. The volume flow is constant. It is usually predetermined, i.e. a set-point for a control loop. In the pump, for example, the voltage is controlled so that a corresponding volume flow is ejected. For this purpose, the stroke of a solenoid is measured, for example. If the voltage in the pump is increased, the flow and thus the power of the pump increases. The counterpressure against which the pump is working can thus be determined from the power. This counterpressure can then be output by the pump.

During operation, a set-point is entered for the volume flow, for example. The pump control then outputs the counterpressure. This counterpressure still contains the pressure of the fluid when the fluid is fed in and friction losses in the line. However, these pressures are constant, so that the internal gas pressure in the storage volume results from the pressure differences.

Determining the internal gas pressure by means of the power consumption of the pump has the advantage that a separate pressure sensor is not required. Furthermore, there are no additional parts that come into contact with the second liquid. Furthermore, there are no additional sealing surfaces and there are no electronic components in the vicinity of the second liquid, which may be a chemical.

According to one embodiment of the invention, the liquid ejection device has a removal device for removing, i.e. in particular ejecting, the liquid which is located in the storage volume.

In one embodiment, the control device is coupled to the removal device and is designed to start an ejection process by means of the removal device when a predetermined liquid volume and the predetermined mixing ratio are reached. During the ejection process, the liquid in the storage volume is ejected at an ejection rate, in particular by an ejection element, for example a nozzle, coupled to the removal line.

The ejection process can be carried out in a manner known per se, for example by means of a pump that sucks liquid from the storage volume and delivers it to a removal device. The ejection process can include opening the shut-off device, in particular a shut-off valve, of the removal line and/or closing further valves, as well as starting a pump to eject the mixture. In addition, it may be provided that the liquid is forced out of the storage volume through the removal line. The removal device can therefore be designed, for example, as a pump through which liquid can be sucked out of the storage volume and ejected. Alternatively, it can be designed as a compressor that builds up a pressure in the storage volume that forces the liquid contained therein to be pushed out.

The ejection element may be formed in a manner known per se and may comprise, for example, a nozzle. The ejection element can form and shape a jet of liquid and can direct it in a specific direction or in specific directions. Furthermore, the ejection element may comprise a pressure control means, by which, for example, a pressure of the ejected liquid can be controlled.

The liquid introduced into the storage volume can be ejected in specific portions, in particular after a specific amount of liquid has been introduced, for example to apply the liquid to a surface. The desired mixing ratio is first produced and then the liquid is ejected, so that a defined ejection, for example of a specific cleaning agent concentration, is ensured.

In particular, the supply of the first liquid is not controlled or is only roughly controlled, for example by switching the supply on and off or by opening and closing a valve. By contrast, the second supply rate is controlled by means of a valve, a device for throttling the supply line for the first liquid, or by actuation of a supply unit for the second liquid.

In further embodiments of the invention, alternatively or additionally, the first supply rate is controlled such that the predetermined mixing ratio of the first and second liquids in the storage volume is achieved.

The ejection of the liquid in portions as per the invention, which can also be referred to as a "batch-wise" supply or a supply in "batches", is in contrast to known devices in which the liquids are introduced and mixed simultaneously in a continuous stream or are kept ready in pre-mixed form. For example, a concentrated cleaning agent is dosed, or "injected", into a continuous stream of water. Instead, in the invention, the mixture is not provided as a continuously mixed and ejected liquid stream in which the second liquid is continuously metered into the stream of the first liquid, but the first and second liquids are first introduced into the storage volume in a desired ratio. Removal only takes place subsequently, in particular after a certain target volume and a certain mixing ratio have been reached.

This means that practically any mixing ratio can be achieved, in particular also those in which the second liquid is present in a particularly high concentration. For example, a mixing ratio of 1% to 60% of the second liquid, preferably 10% to 50% of the second liquid in the total liquid volume can be specified. If supplied into a stream of the first liquid, the second liquid would have to be introduced at a very high supply rate for this purpose, which would require a correspondingly powerful pump. This problem arises especially when the removal rate is particularly high, that is, when a large volume of the mixture must be provided within a short period of time. In the device according to the invention, on the other hand, smaller dimensioned pumps are sufficient, in particular for supplying the second liquid, since the introduction into the storage volume can take place at a lower rate than would be necessary for continuous dispensing.

The supply line and the removal line may be differently configured in ways known per se, and a second supply line coupled upstream to the storage volume may be provided for supplying the second liquid. In particular, they may comprise valves preventing a flow of liquids in an unintended direction, for example check valves, pinch valves, electromagnetic valves or needle valves. In particular, a plurality of supply lines and/or removal lines may also be provided. For example, different supply lines may be provided for the first and second liquids.

In a further embodiment, the removal device is designed in such a way that the removal rate is greater than the sum of the maximum achievable first and second supply rate. The removal rate can be variable over time and can, for example, indicate the maximum ejection rate. Advantageously, this means that the ejection can take place faster or at a higher pressure than the feed of the liquids into the storage volume. This is made possible by the fact that the predetermined total volume is first introduced into the storage volume and only then ejected. The achievable ejection speed is therefore independent of the maximum introduction speed.

In one embodiment, the first liquid can be introduced at a constant volumetric flow rate. In particular, the first supply rate is substantially constant. A constant volumetric flow is understood to mean, in particular, a volumetric flow that deviates by less than ±5% from a set volumetric flow. Advantageously, the device can thus be designed to be particularly simple.

For example, water may be introduced as first liquid from a line into the storage volume, with only a valve being able to be opened or closed during the supply and no further control of the first supply rate taking place. In particular, during the supply of the first liquid, the flow rate is not measured directly, but can be determined only from the total amount of liquid introduced into the storage volume and from a measurement of the amount of the second liquid introduced. By detecting the amount of liquid introduced into the storage volume, the device can adjust and control the supply of the second liquid to achieve a specific mixing ratio with a predetermined amount of liquid in the storage volume.

In the invention, the first and second liquids are introduced into the storage volume such that a predetermined mixing ratio is achieved. Furthermore, a predetermined target volume of the mixture is achieved. By detecting the pressure, in particular during the introduction of the second liquid, it is possible in particular to continuously readjust the speed and/or pressure at which the first and/or second liquid is introduced. The current values and the values specified as target values for the target volume and the mixing ratio can be used for the control.

Furthermore, the volume of the first or second liquid introduced into the storage volume and/or the total volume of the mixture already introduced can be detected. The detection unit can be designed in a manner known per se to detect the total volume of liquid in the storage volume.

According to one embodiment of the invention, the liquid ejection device comprises a flow sensor with which the introduced volume of the second liquid can be detected.

In a further embodiment, the flow sensor for detecting the introduced volume of the second liquid is coupled to or comprised by the detection unit. In this way, the introduced volume can advantageously be determined directly and particularly precisely. Furthermore, the introduced volume of the first liquid can also be detected by means of a flow sensor. However, such a measurement may require additional sensors and devices.

The flow sensor is formed in a manner known per se and may be arranged, for example, in a supply line for introducing the second liquid. Furthermore, the supply unit can use a flow sensor or a corresponding device for detecting the volume flowing through, with the flow being determined in particular directly on the basis of the activity of the supply unit, for example on the basis of the frequency with which a certain piston volume is introduced. Such a determination of the volume is particularly easy to perform in the case of a piston pump. By integrating or summing the flow rate over time, it is possible to determine which volume of the second liquid was introduced into the storage volume. Furthermore, the introduced volume of the first liquid can be detected in a similar way.

The detection unit may alternatively or additionally comprise various other sensors or devices for detecting the total volume of liquid introduced, for example a float in the storage volume or an equivalent unit.

The mixing ratio in the storage volume can be determined on the basis of the detected total liquid volume and the volume of the second liquid introduced. In particular, a concentration of the second liquid is determined. In further embodiments, it may be provided that more than two liquids are introduced and the mixing ratio is as in the form of a ratio of the volume of the second liquid to the total liquid volume.

In one embodiment, the predetermined liquid volume and/or the predetermined mixing ratio are detected by a user, for example by means of an input. This may comprise, for example, a numerical input or a choice between different settings, each of which is assigned a liquid volume and a mixing ratio. For example, these may be different programs of the vehicle washing facility.

The storage volume can be designed in various ways known per se. It comprises a hollow space that can be closed off from the outside space in a liquid-tight and, in particular, gas-tight manner. For this purpose, it is provided in particular that openings of the storage volume, in particular for the introduction or removal of liquids and gases, can be closed off gas-tightly by valves. Alternatively, the storage volume can be open, and in particular an exchange of gas with other components or an external space is possible as long as there is no shut-off against the exchange of gas, for example by means of a lid or valve. If the liquid is a wheel rim cleaner, the storage volume preferably holds 50 ml to 300 ml, particularly preferably 100 ml to 150 ml. If the liquid is a pre-cleaner, for example an insect cleaner, the storage volume preferably holds 5 l to 10 l.

In another embodiment, the storage volume is formed by a liquid line. Such a line can be formed by a hose, for example, and is characterised by an elongate extension and a substantially constant cross-section that is small compared to the length of the line. In particular, the length is at least one hundred times, preferably at least five hundred times, the diameter of the line. The liquid line has an end connected to a removal device, such as a line system for distributing liquids and/or an ejection element, such as a nozzle. In this case, in particular, the liquid line is provided with a pressure bladder, for example a diaphragm pressure bladder or an air vessel. This advantageously utilises a cavity as a storage volume, which is already present in typical equipment, to direct the mixture to a removal device. Existing facilities can thus be adapted or converted particularly easily. Openings for introducing and/or removing liquids from the liquid line can be arranged, for example, by means of holes in the line wall.

According to another embodiment, in which a pressure bladder is only optionally used, the liquid line forming the storage volume can be filled as follows: Initially, the liquid line is filled with gas only. The pressure in the liquid line is atmospheric pressure. The shut-off valve is now closed and the liquids are added, against the gas pressure inside the liquid line, which increases because the system is closed gas-tightly and pressure-tightly. In particular, the geometry of the liquid line is such that the gas in the liquid line can flow past the metered liquid, so that the gas collects in the upper part of the liquid line. During the ejection process by means of the removal device, expulsion gas can flow in with a pressure there that is higher than the pressure in the compressed gas in the storage volume, so that the liquid is expelled from the storage volume with the shut-off valve open.

In a further development, the first and/or second liquid comprises a cleaning agent. The device can thus advantageously be used to dose the cleaning agent as required. For example, it can be an agent for cleaning the wheel rims of a vehicle. The device allows this agent to be dosed in a particularly flexible manner, for example in order to treat wheel rims according to their particular degree of soiling and to avoid concentrations that are too high or too low.

In a further development, the removal device comprises a gas supply unit and the control unit is designed to open the shut-off device during the ejection process and to introduce an expulsion gas into the storage volume through the gas supply unit in such a way that the mixture with the first and second liquids is expelled from the storage volume. The gas supply unit may in particular comprise a connection for compressed air or a compressor. Advantageously, gas pressure can thus be applied to the storage volume in such a way that the liquid contained therein, in particular the mixture produced therein, is expelled particularly quickly and completely. In a further embodiment, the expulsion gas can be introduced and pressurised in such a way that the shut-off device is opened by this pressure.

A prerequisite for ejection by means of an expulsion gas is that the storage volume is sealed gas-tightly and the built-up pressure can only be discharged through the removal opening with simultaneous ejection of the liquid mixture. The gas-tight seal of the storage volume must in particular withstand the pressure of the expulsion gas introduced, with a pressure relief valve being provided if necessary. It can be provided here that a gas with a pressure of 4 to 8 bar, preferably 6 bar, is introduced into the storage volume. As a result of this and by a suitable control of the supplied pressure, it can be achieved that the mixture of liquids is ejected from the storage volume with a defined pressure, for instance in order to achieve a uniform spray pattern and a homogeneous wetting of the surface.

In contrast to this, the removal of liquids is usually achieved by means of a pump and the expulsion by means of a gas is only known to empty a removal device, such as spray nozzles or tubes, and/or to prevent dripping. In this case, residual liquid in particular is expelled. By contrast, in the device according to the invention, the entire ejection of the mixture can be driven by means of air pressure.

When discharging the liquid mixture, it can be provided that the shut-off device is controlled in such a way that it only releases the removal opening for the removal or ejection of the liquid. The shut-off device can also be designed in such a way that it opens when a certain pressure in the storage volume is exceeded, for example as a pressure relief valve, or an actuation for actively opening the valve can be provided. In addition, valves can be provided at further openings, in particular at a supply opening, which act as check valves and thus prevent part of the pressure from being discharged via the supply openings.

By expelling the mixture by means of a pressurised gas, the storage volume can also be completely emptied and dripping can additionally be prevented. In particular, after the liquid mixture has been expelled, the storage volume is filled substantially only with the gas, such as air. If the first and second liquids are now added again, the mixing ratio is not substantially distorted by residues of the previously removed mixture. In addition, it can be avoided that the storage volume, a removal line and/or removal devices are filled with aggressive liquids or are in contact with them for longer than necessary.

In a further embodiment, the first and/or second supply line is coupled to the storage volume in an upper region. The upper region is formed here in such a way that it is not arranged below the liquid level even when a maximum amount of liquid is introduced into the storage volume. Advantageously, this allows the first and/or second liquid to be introduced in such a way that the counterpressure effective during the process corresponds to the internal gas pressure. For example, at least the second liquid is introduced against the pressure of a gas located in the storage volume.

The "upper region" is therefore defined by the effect of the force of gravity, such that gases rising in a liquid move in its direction and accumulate in the upper region. Conversely, liquids collect in a lower region of the storage volume.

Furthermore, it can be provided that the removal line is coupled in the lower region to the storage volume, which is already below the liquid level, in particular with a small introduced liquid amount. In this way, the removal can be carried out particularly efficiently through the removal line. The connection of the removal line can be arranged approximately at the lowest point of the storage volume, so that when the target volume of the mixture is reached, the connection is substantially completely covered by the mixture until the removal is complete and the mixture can be removed through it. In particular, a plurality of supply lines and/or removal lines may be provided.

In a further development, a branch line is arranged downstream of the shut-off device for distributing the ejected liquid to at least two ejection elements. Advantageously, this allows a plurality of ejection elements to be supplied with liquid. The branch line can, for example, comprise a T-piece or a device with a plurality of connections, to which the ejection elements are connected further downstream.

The method according to the invention of the type mentioned at the outset is characterised in that the storage volume is sealed gas-tightly so that an increase in the internal gas pressure of the storage volume occurs when the first liquid is introduced. When the second liquid is introduced, the internal gas pressure of the storage volume is detected and the introduction of the second liquid is controlled as a function of the detected internal gas pressure in the storage volume. It is controlled here in such a way that a predetermined mixing ratio of the first and second liquid is achieved in the storage volume.

The method according to the invention is in particular designed to operate the device according to the invention described above. The method thus has the same advantages as the device according to the invention.

In one embodiment of the method according to the invention, a current volume of liquid in the storage volume is detected, in particular on the basis of the internal gas pressure, and the liquid is ejected from the storage volume when a predetermined volume of liquid in the storage volume is reached.

Alternatively or additionally, the liquid can be ejected from the storage volume when the predetermined mixing ratio of the first and second liquid in the storage volume has been reached.

Advantageously, this allows a high ejection rate to be achieved even if the supply into the storage volume can only take place at slower rates. Specifically, the removal rate here, after reaching the predetermined volume of liquid, is independent of the rate at which the first and/or second liquid was supplied. In particular, the ejection rate is higher than the maximum supply rate.

In a further embodiment, the liquid is ejected at a removal rate that is greater than the sum of the maximum achievable first and second supply rates. Advantageously, this allows a particularly fast ejection to be achieved.

When starting the ejection process, the shut-off device can be opened and further valves, in particular at the supply opening, can be closed. The ejection can be carried out by means of a pump or the mixture in the storage volume can be expelled by means of a pressurised expulsion gas, in particular air.

In a further embodiment, the liquid ejected from the storage volume is distributed to at least two ejection elements through a branch line arranged downstream of the shut-off device. In this way, a plurality of ejection elements, such as nozzles, can advantageously be supplied with the liquid mixture from the storage volume at the same time. It may be provided that the liquid is distributed in such a way that it is ejected by the ejection elements at the same ejection rate. Furthermore, the ejection elements can be designed in such a way that the rate of liquid ejection can be adjusted or controlled.

In a development, the first liquid is supplied at a substantially constant first supply rate, in particular at constant pressure. In particular, the second liquid is introduced with variable pressure, which is determined and controlled on the basis of the predetermined mixing ratio.

The method can thus be carried out particularly simply and with little expenditure on control units, since, for example, a means for changing the first supply rate can be omitted.

BRIEF DESCRIPTION OF THE DRAWINGS

The invention will now be explained by means of exemplary embodiments with reference to the drawings.

DETAILED DESCRIPTION OF THE INVENTION

Figure 1:
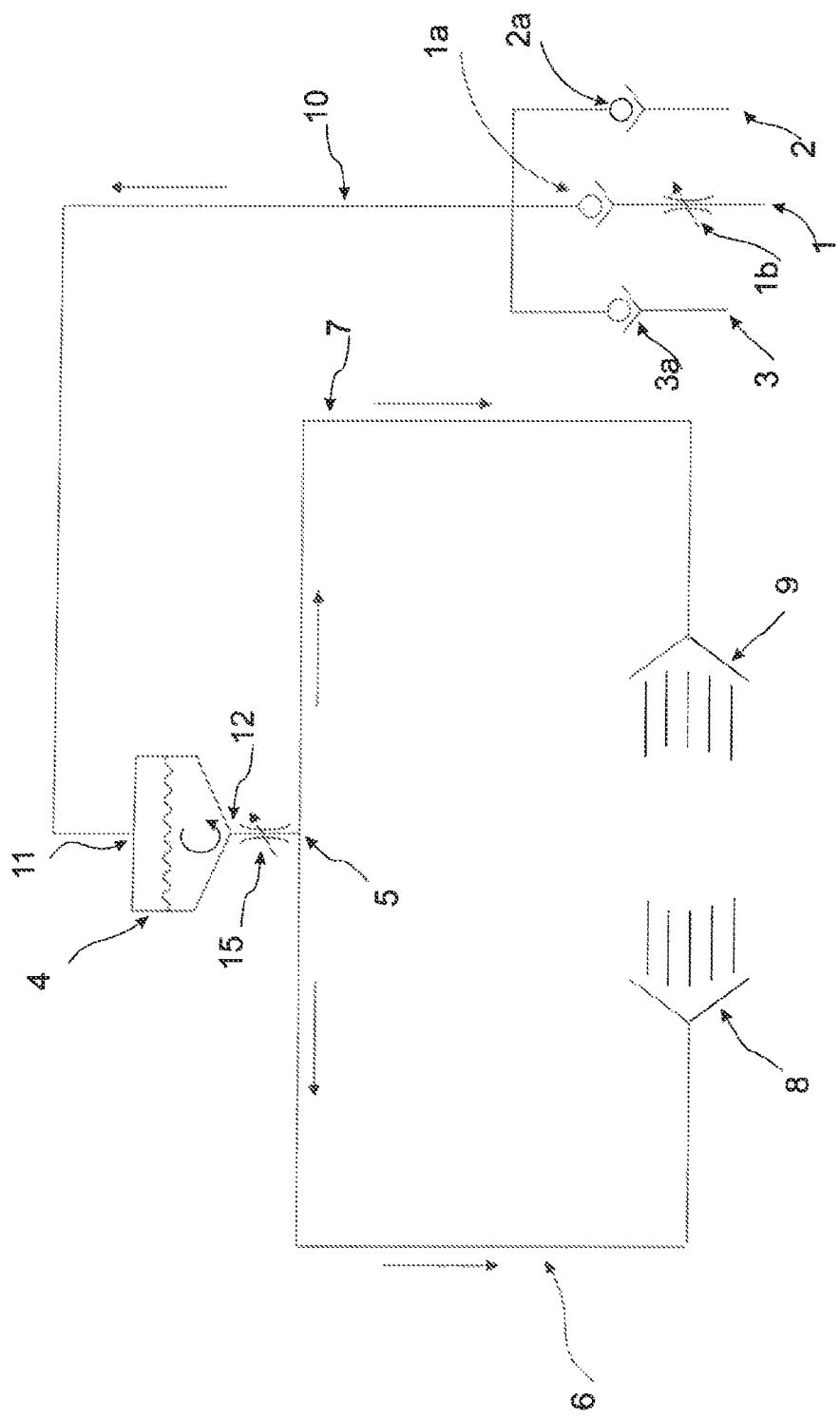
FIGS. 1 and 2 show a first exemplary embodiment of the liquid ejection device according to the invention.
Figure 2:
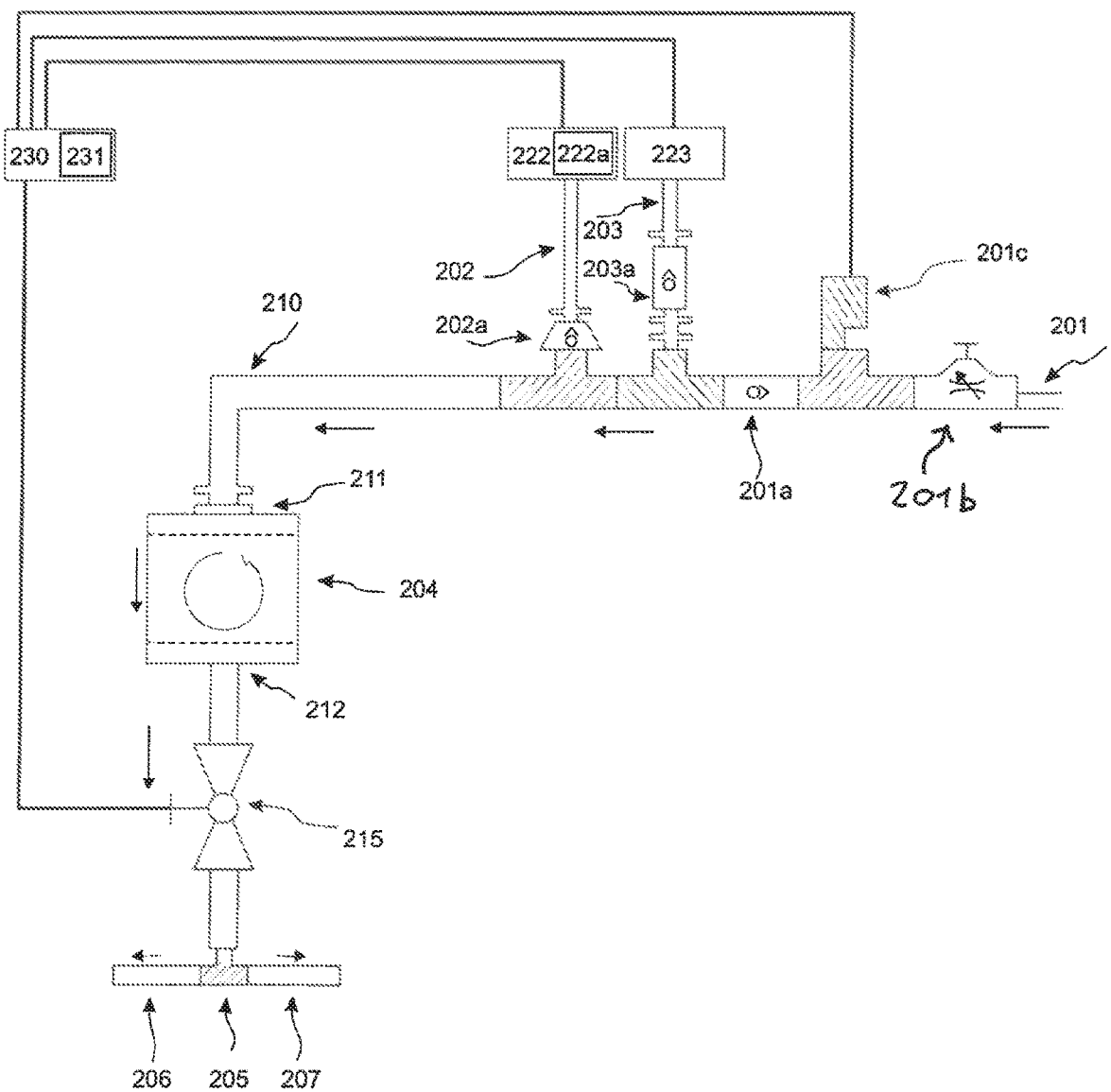

With reference to FIGS. 1 and 2, an exemplary embodiment of the device according to the invention is explained. FIG. 2 shows a more detailed view than FIG. 1.

The device comprises a feed line 10, 210, which is connected to a supply opening 11, 211 of a storage container 4, 204. The storage container 4, 204 further comprises a removal opening 12, 212, to which a removal line to a T-piece 5, 205 is connected, with a shut-off device 15, 215, designed as a shut-off valve 15, 215 and in particular as a pinch valve, being arranged in the removal line. From the T-piece 5, 205 the line branches into two distribution lines 6, 7, 206, 207, which lead to nozzles 8, 9 of a vehicle washing facility. Instead of the T-piece 5, 205, another branch line can also be used. In the exemplary embodiment, the storage container 4, 204 is sealed gas-tightly when the shut-off device 15, 215 is closed. In this case, fluids can be exchanged through the supply opening 11, 211, but the feed line 10, 210 connected to this can also be sealed gas-tightly by closing the connected valves.

A chemical supply 2, 202 with a check valve 2a, 202a and an air supply 3, 203 with a further check valve 3a, 203a are connected to the feed line 10, 210. The chemical supply 2, 202 is connected here to a supply unit 222, in particular an electric metering pump 222, through which a liquid, in particular a cleaning agent, can be supplied. The electric metering pump 222 comprises a pressure detection element 222a. Furthermore, the air supply 3, 203 is connected to a gas supply unit 223, in particular an air compressor or another source of compressed air.

Upstream thereof, a further check valve 1a, 201a, an electromagnetic water valve 201c, a throttle 1b, 201b and a water supply 1, 201 connected to a water supply are provided in the feed line 10, 210. In the exemplary embodiment, the storage container 4, 204 and the feed line 10, 210 thus form a storage volume that can hold a certain volume of fluid.

A control unit 230 is provided to control the device, which control unit comprises a detection unit 231 and is coupled to the electromagnetic water valve 201c, the electric metering pump 222, the gas supply unit 223 and the shut-off valve 15, 215.

Water from the water supply 1, 201 is fed into the feed line 10, 210 at a constant pressure, and the water volume flow can be adjusted by means of the throttle 1b, 201b. The water supply line can further be switched on and off by means of the electromagnetic water valve 201c. The supplied water passes through the check valve 1a, 201a. The further check valve 3a, 203a prevents the water from entering in the direction of the air supply 3, 203. The water flow further passes the connection to the chemical supply 2, 202, with a check valve 2a, 202a also preventing water from entering here. It lastly enters the storage container 4, 204 through the supply opening 11, 211.

In further exemplary embodiments, at least one flow sensor can be provided, which can be arranged in the feed line 10, 210, for example. It can also be arranged in the region of the water supply 1, 201 and/or the chemical supply 2, 202.

With reference to FIGS. 1 and 2, an exemplary embodiment of the method according to the invention is explained.

In the exemplary embodiment of the method, the shut-off valve 15, 215 is closed in a basic state so that the storage container 4, 204 is sealed gas-tightly except for the supply opening 11, 211. The storage container 4, 204 and in particular also the feed line 10, 210 are filled with air in the basic state. Therefore, when liquid is introduced into the storage container 4, 204, the air pressure in the empty storage container 4, 204 increases. The introduced liquid is incompressible, so that the volume of liquid introduced into the storage container 4, 204 can be determined on the basis of the internal gas pressure. This is done using Boyle-Mariotte's law, which describes the relationship between pressure and volume of an ideal gas under isothermal conditions. For the purposes of the invention, the description as an ideal gas is sufficient, but modifications and corrections to adapt the calculation method to real conditions may also be provided.

In the basic state, the volume $V_1$ of the empty storage container 4, 204 corresponds to the volume $V_1$ of the gas in it. In the first state, the gas has the pressure $p_1$, which corresponds in particular to the ambient pressure. After the introduction of a volume $V_3$ of liquid, the gas contained in the storage container 4, 204 takes up a reduced volume $V_2$ calculated according to the difference $V_2=V_1-V_3$. Since the volume of liquid $V_3$ is incompressible, the pressure $p_2$ of the gas increases due to the reduced volume according to the equation:

$$p_1 * V_1 = V_2$$

From this, the volume of liquid $V_3$ introduced is calculated as follows:

$$V_3 = V_1 * (1 - p_1/p_2)$$

Alternatively or additionally, other approaches can be used to calculate the introduced liquid volume on the basis of the internal gas pressure $p_1$, $p_2$.

In the exemplary embodiment, the internal gas pressure $p_1$, $p_2$ is detected by the pressure detection element 222a, which detects the power consumption of an electric metering pump 222 by means of which the second liquid is supplied at the chemical supply 2, 202. In the exemplary embodiment, a cleaning agent is pumped from the chemical supply 2, 202 and through the check valve 2a, 202a into the feed line 10, 210. In this case, the pump 222 works against the internal gas pressure in the storage container 4, 204, so that as the internal gas pressure increases, a higher output of the metering pump 222 is required to achieve the same rate of introduction of the cleaning agent.

In the exemplary embodiment, a solenoid diaphragm metering pump of the gamma/X type by ProMinent® is used as the metering pump 222. This pump has a solenoid control that measures and outputs the counterpressure. During operation, a set-point of 27 ml/min, for example, is entered for the volume flow. The pump control then displays the counterpressure. This counterpressure still contains the pressure of the liquid when the fluid is fed and friction losses in the line. However, these pressures are constant, so that the internal gas pressure in the storage container 4, 204 or generally in a storage volume results from the pressure differences.

This means that the volume of liquid in the storage container 4, 204 is determined by the internal gas pressure. This is particularly advantageous if there are no or only inaccurate possibilities for directly measuring the volume, for example in the case of a flow measurement at the water supply 1, 201 or in the feed line 10, 210.

At the same time, in the exemplary embodiment, it is provided that the electric metering pump 222 measures the volume of the cleaning agent pumped by it as the cleaning agent is fed. In other exemplary embodiments, a flow sensor can be used for this purpose.

In further embodiments, alternatively or additionally, another sensor may be provided for measuring the volume of liquid in the storage container 4, 204. For example, a float can be used or the mass of the introduced liquid can be determined.

The water is mixed with the cleaning agent in the storage container 4, 204, and this is indicated by a round arrow in FIGS. 1 and 2. This allows the first and second liquids to be homogeneously distributed in the liquid mixture. In the exemplary embodiment, the ejection of the mixture is additionally carried out in such a way that a substantially homogeneous mixing is achieved, in particular when applied to a surface, i.e. shortly after leaving the system. Mixing can be improved in a further exemplary embodiment by an additional mixing device (not shown).

A current mixing ratio between the water and the cleaning agent results from the fed volume of the cleaning agent and the total liquid volume in the storage container 4, 204. If necessary, the mixing ratio can be adjusted by controlling the water supply 1, 201, for example by means of the throttle 1b, 201b and the electromagnetic water valve 201c, and/or the chemical supply 2, 202 by means of the metering pump 222.

At the same time, in the exemplary embodiment, the volume of liquid in the storage container 4, 204 is compared with a predetermined target volume. When the target volume is reached, which corresponds in particular to reaching a certain target pressure in the storage container 4, 204, the introduction of water and cleaning agent is stopped, in the exemplary embodiment by closing the electromagnetic water valve 201c and stopping the electric metering pump at the chemical supply 2, 202.

In the exemplary embodiment, it is provided that, after reaching the target volume, the mixture is ejected from the storage container 4, 204 by means of compressed air. For this purpose, compressed air is introduced at the air supply 203. The air supply 203 thus assumes the role of a removal device 223; alternatively or additionally, in other exemplary embodiments, another removal device 223 may be provided, for example a pump for ejecting the liquid from the storage container 4, 204. A pressure of 4 to 8 bar, preferably 6 bar, is provided. The check valve 201a prevents the pressure from being discharged against the direction of flow in the feed line 10, 210, and prevents the pressurised air from reaching the storage container 4, 204. At the same time, the shut-off valve 15, 215 is opened. Since the removal opening 12, 212 is arranged in the lower region of the storage container 4, 204, the liquid amount contained therein can be ejected substantially completely.

In further exemplary embodiments, it can be provided that the shut-off valve 15, 215 is designed as a pressure relief valve and opens automatically when a certain pressure is reached, for example at a pressure of 6 bar. In addition, further valves can be provided, for example in the distribution lines 6, 7, 206, 207.

The liquid mixture ejected from the storage container 4, 204 is led through the T-piece 5, 205 into the distribution lines 6, 7, 206, 207 and from there reaches ejection elements 8, 9, which are not shown in detail in FIG. 1. In the exemplary embodiment, these are nozzles 8, 9 of a vehicle washing facility.

In the exemplary embodiment, compressed air is fed into the storage container 4, 204 until it is completely empty. It is also provided here that the connecting lines, in particular the T-piece 5, 205 and the distributor lines 6, 7, 206, 207 as well as, if necessary, the nozzles 8, 9 are emptied and the liquid mixture is completely ejected through the nozzles 8, 9. In this way, potentially aggressive chemicals are prevented from residing in the components of the system for an unnecessarily long period of time, and dripping is also avoided.

In a final step, the supply of compressed air is stopped and the shut-off valve 15, 215 is closed. The storage container 4, 204 remains filled with air at ambient pressure.

In further exemplary embodiments, the ejection may be performed in other ways, for example by introducing water or other fluid under pressure or by drawing it out of the storage container 4, 204 by means of a pump and ejecting it through the distribution line 6, 7, 206, 207.

Figure 3:
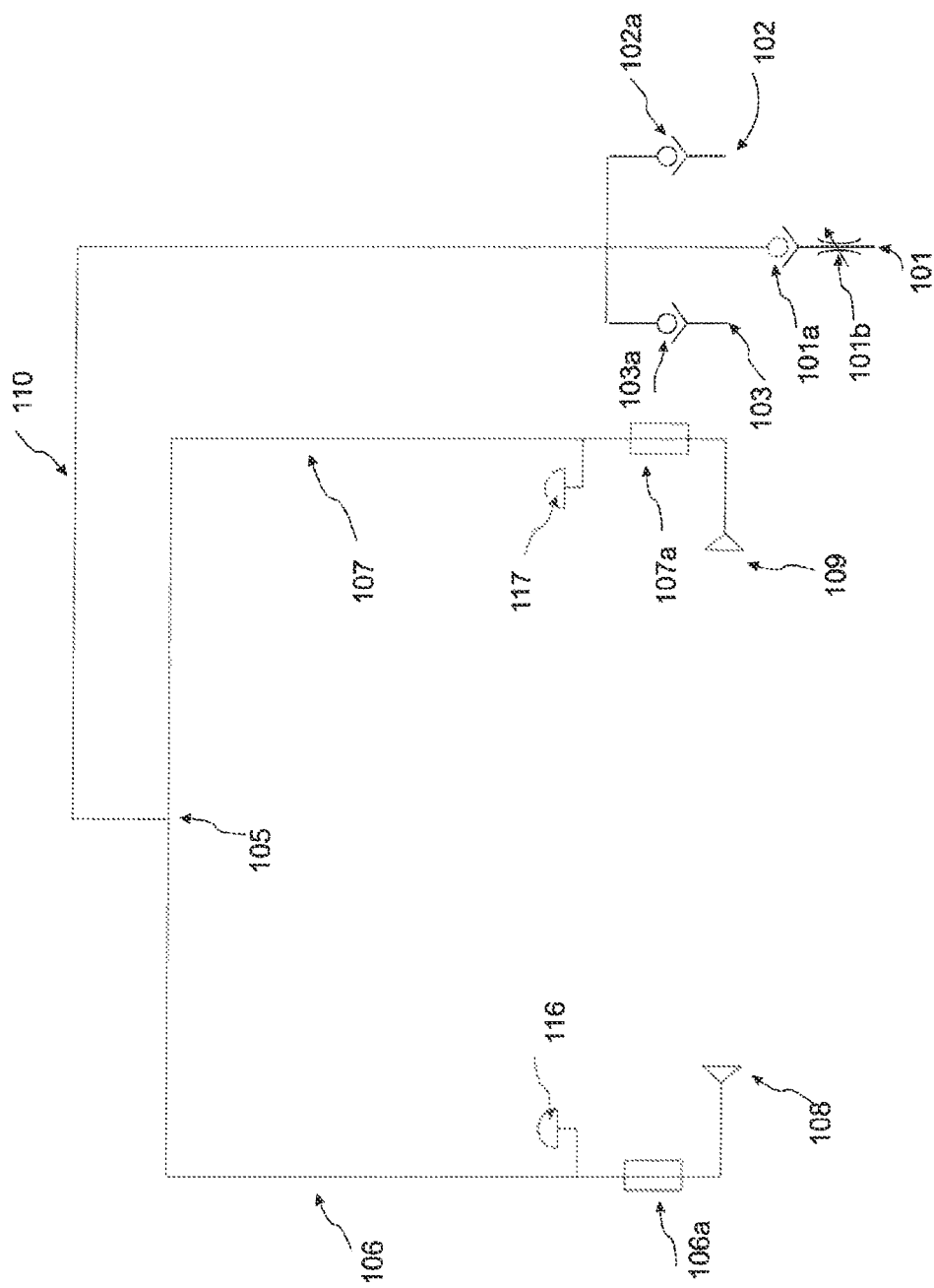
FIG. 3 shows a further exemplary embodiment of the liquid ejection device according to the invention.

With reference to FIG. 3, a further exemplary embodiment of the device according to the invention is explained. The present construction is basically analogous to that shown in FIGS. 1 and 2. Therefore, the differences will be explained below.

In the further exemplary embodiment, it is provided that the storage container is formed by a feed line 110. The feed line 110 is designed in such a way that it comprises a sufficiently large volume for providing the desired mixture.

For example, a 4 m long feed line 110 is provided, which holds a volume of around 50 ml for an inner diameter of 4 mm and a volume of around 113 ml of liquid for an inner diameter of 6 mm. The feed line 110 leads to a T-piece 105, which can be designed in different ways, for example to allow rotation around the axis of the feed line 110. Distribution lines 106, 107 branch off downstream from this T-piece 105, the length of which distribution lines is, for example, 5 m in total, which corresponds to a volume of around 63 ml with an inner diameter of 4 mm. At the end of the distribution lines 106, 107, nozzles 108, 109 are provided, through which a liquid can be sprayed out, for example onto wheel rims of a vehicle in a vehicle washing facility. The feed line 110 and the distribution lines 106, 107 thus form a storage volume into which fluids can be introduced.

Upstream at the other end of the feed line 110 there are connected a water supply 101 with a throttle 101b and a check valve 101a, a chemical supply 102 with a check valve 102a, and an air supply 103 with a check valve 103a.

In the exemplary embodiment shown here, it is provided that a constant water flow is directed into the feed line 110 through the throttle 101b. It is further provided that a cleaning agent is injected at the chemical feed 102, using an electric metering pump. A gas- and liquid-tight valve 106a, 107a is provided in each of the distribution lines 106, 107, each of which valves can be opened by an electrical signal at a certain pressure, for example 5 bar. A pressure bladder 116, 117 is arranged in front of each valve 106a, 107a in the distribution line 106, 107. Gas is compressed in the pressure bladders 160, 117, as in the storage containers 4, 204. Therefore, when water and cleaning agent are introduced, a pressure is built up in the feed line 110 and the distribution lines 106, 107. This pressure is measured during the introduction of the cleaning agent by means of the power consumption of the electric metering pump at the chemical feed 102. In this way, as described above, the total volume of the current liquid introduced can be determined. At the same time, the electronic metering pump measures the injected volume of the cleaning agent and controls the supply line so that a predetermined mixing ratio is achieved.

When the predetermined mixing ratio and a predetermined volume are reached, the mixture in the feed line 110 and the distribution lines 106, 107 is expelled by supplying compressed air at a high pressure, for example 6 bar, during the air supply 103. The valves 106a, 107a are opened, for example by means of electrical signals, and the mixture can be sprayed out through the nozzles 108, 109.

In the exemplary embodiment, it is further provided that, after the mixture is dispensed, a stream of water is dispensed through the nozzles 108, 109, flushing the feed line 110, the T-piece 105 and the distribution lines 106, 107 as well as the nozzles 108, 109. In addition, excess after-flow can be avoided by applying compressed air to the end of the nozzles 108, 109 to expel residual liquids.

A mixing of the introduced liquids can occur in the device by introducing them simultaneously. However, homogeneous mixing does not necessarily have to be achieved; it may be sufficient that the components of the mixture mix homogeneously due to the application with high pressure outside the device.

In a further exemplary embodiment, the liquids are provided by the same supply unit, in particular one after the other. For example, a pump can be provided that first introduces water and then a cleaning agent into the storage container 4, 204.

In yet a further embodiment, the pressure bladder 116, 117 is omitted in the device according to FIG. 3. In this case, the gas in the feed line 110 and the distribution lines 106, 107 is displaced by the supplied liquid, so that the gas collects in the upper part of the feed line 110 and is compressed there. The air supply 103 is also located in this upper region, via which compressed air can be supplied at high pressure.

In this case, the shut-off devices 106a, 107a are thus first closed and the liquids are metered in, against the gas pressure inside the feed line 110 and the distribution lines 106,107. Since the system is closed gas-tightly and pressure-tightly, the gas pressure in the storage volume formed by the feed line 110 and the distribution lines 106,107 increases. The geometry of the feed line 110 and the distribution lines 106,107 is such that the gas can flow past the metered liquid, so that the gas collects in the upper part of the storage volume. During the ejection process, compressed air at a pressure is supplied to the upper part of the storage volume by means of the air supply 103. At the same time, the shut-off devices 106a, 107a are opened. The pressure of the compressed air is in particular greater than the pressure of the compressed gas in the storage volume. However, it can also be lower than the pressure of the compressed gas in the storage volume, since opening the shut-off devices 106a, 107a leads to a pressure drop of the gas in the upper part of the storage volume. The compressed air then expels the liquid from the storage volume.

LIST OF REFERENCE NUMERALS

1, 101, 201 First supply line, water supply
1a, 101a, 201a Check valve 1b, 101b, 201b Needle valve, throttle
201c Electromagnetic water valve
2, 102, 202 Second supply line, chemical supply
2a, 102a, 202a Check valve
3, 103, 203 Air supply
3a, 103a, 203a Check valve
4, 204 Storage container
5, 105, 205 Branch line, T-piece
6, 7, 106, 107, 206, 207 Distribution line
106a, 107a Shut-off device, pressure relief valve
8, 9, 108, 109 Ejection element, nozzle
10, 110, 210 Feed line
11, 211 Supply opening
12, 212 Removal opening
15, 215 Shut-off device, shut-off valve
116, 117 Pressure bladder
222 Supply unit, electric metering pump
222a Pressure detection element
223 Removal device, gas supply unit
230 Control unit
231 Detection unit

The invention claimed is:

1. A liquid ejection device for a vehicle washing facility, the device comprising:
   a storage volume;
   a first supply line coupled upstream to the storage volume for supplying a first liquid;
   a supply unit coupled upstream to the storage volume for supplying a second liquid; and
   a removal line coupled downstream to the storage volume for discharging a liquid to be ejected, with a shut-off device for shutting off a liquid flow through the removal line;
   wherein the storage volume is sealed gas-tightly, so that an increase in an internal gas pressure occurs in the storage volume when liquid is introduced;
   the liquid ejection device further comprises a detection unit for detecting the supplied volume of the second liquid into the storage volume and the internal gas pressure in the storage volume;
   a control unit coupled to the detection unit and the supply unit controls the supply of the second liquid on the basis of the detected supplied volume of the second liquid and the internal gas pressure in such a way that a predetermined mixing ratio of the first and second liquid is achieved in the storage volume; and
   the supply unit comprises a pressure detection element for detecting the internal gas pressure,
   wherein the pressure detection element is designed to detect a power consumption of the supply unit and to detect the internal gas pressure on the basis of the power consumption.

2. The device according to claim 1, wherein the control unit is designed to determine a current mixing ratio of the liquid in the storage volume on the basis of the detected internal gas pressure and the introduced volume of the second liquid.

3. The device according to claim 1, wherein the supply unit comprises an electric metering pump.

4. The device according to claim 1, wherein the control device is coupled to a removal device and is designed to start an ejection process by means of the removal device when the predetermined liquid volume and a predetermined mixing ratio are reached.

5. The device according to claim 4, wherein the removal device is designed such that a removal rate is greater than the sum of the maximum achievable first and second supply rates.

6. The device according to claim 1, wherein the first liquid can be introduced with a constant volume flow.

7. The device according to claim 1, wherein a flow sensor for detecting the introduced volume of the second liquid is coupled to or comprised by the detection unit.

8. The device according to claim 1, wherein the storage volume is formed by a liquid line.

9. The device according to claim 8, wherein the liquid line is provided with a pressure bladder.

10. The device according to claim 8, wherein the geometry of the liquid line is such that the gas in the liquid line can flow past the metered liquid so that the gas collects in the upper part of the liquid line.

11. The device according to claim 1, wherein the removal device comprises a gas supply unit and the control unit is designed to open the shut-off device during the ejection process and to introduce an expulsion gas into the storage volume through the gas supply unit in such a way that the mixture comprising the first and second liquids is expelled from the storage volume.

12. Device according to claim 11, wherein the gas supply unit comprises a connection for compressed air or a compressor.

13. The device according to claim 1, wherein the first and/or second supply line is coupled in an upper region to the storage volume.

14. A method for operating a liquid ejection device for a vehicle washing facility; in which
   a first and a second liquid are introduced into a storage volume;
   wherein the second liquid is supplied by means of a supply unit;
   a liquid to be ejected is discharged by a shut-off device which is coupled to the storage volume and which shuts off a liquid flow;
   the storage volume is sealed gas-tightly so that an increase in the internal gas pressure of the storage volume occurs when the first liquid is introduced;
   when the second liquid is introduced, the internal gas pressure of the storage volume and the supplied volume of the second liquid is detected;
   the introduction of the second liquid is controlled as a function of the detected internal gas pressure in the storage volume in such a way that a predetermined mixing ratio of the first and second liquid is achieved in the storage volume; and
   the internal gas pressure is detected with the aid of a pressure detection element of the supply unit,
   wherein the pressure detection element detects a power consumption of the supply unit and the internal gas pressure is detected on the basis of the power consumption.

15. The method according to claim 14, wherein a current volume of liquid in the storage volume is detected and the liquid is expelled from the storage volume when a predetermined volume of liquid in the storage volume is reached.

16. The method according to claim 14, wherein the liquid is expelled from the storage volume when the predetermined mixing ratio of the first and second liquids in the storage volume has been reached.

17. The method according to claim 14, wherein the liquid is ejected by means of a pressurised expulsion gas.

18. The method according to claim 14, wherein the liquid is discharged at a removal rate greater than the sum of the maximum achievable first and second supply rate.

19. The method according to claim 14, wherein the first and/or second liquid comprises a cleaning agent.

20. The method according to claim 14, wherein the value of the introduced volume of the first and second liquid is determined on the basis of the detected internal gas pressure of the storage volume.

21. The method according to claim 14, wherein a current mixing ratio is determined on the basis of the total detected volume of liquid and a supplied volume of the second liquid measured on the basis of a flow rate.

\* \* \* \* \*